(12) United States Patent
Krauss (10) Patent No.: US 8,118,536 B2
(45) Date of Patent: Feb. 21, 2012

(54) METHOD AND SYSTEM FOR OPERATING A WIND TURBINE

(75) Inventor: Thomas Krauss, Lingen (DE)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 12/609,754

(22) Filed: Oct. 30, 2009

(65) Prior Publication Data
US 2010/0135793 A1   Jun. 3, 2010

(51) Int. Cl.
*F03D 7/02* (2006.01)
*F03D 11/00* (2006.01)
(52) U.S. Cl. ............................................ 415/1; 415/17
(58) Field of Classification Search .................... 415/37, 415/41; 416/17, 110, 175, 180
See application file for complete search history.

(56) References Cited

U.S. PATENT DOCUMENTS

| 4,503,673 | A | * | 3/1985 | Schachle et al. ................ 60/398 |
| 4,535,252 | A | | 8/1985 | Jacobs et al. |
| 5,990,568 | A | * | 11/1999 | Hildingsson et al. ........... 290/55 |
| 6,320,272 | B1 | * | 11/2001 | Lading et al. ................... 290/44 |
| 6,671,585 | B2 | | 12/2003 | Lof et al. |
| 6,975,925 | B1 | | 12/2005 | Barnes et al. |
| 7,523,001 | B2 | | 4/2009 | Morjaria et al. |
| 2005/0034925 | A1 | * | 2/2005 | Flamang et al. ............. 184/6.12 |
| 2008/0112807 | A1 | * | 5/2008 | Uphues et al. .................... 416/1 |
| 2009/0191060 | A1 | * | 7/2009 | Bagepalli et al. ............. 416/174 |
| 2009/0200114 | A1 | * | 8/2009 | Bagepalli et al. ............ 184/6.22 |
| 2010/0104439 | A1 | * | 4/2010 | Nomaguchi et al. .......... 416/147 |

FOREIGN PATENT DOCUMENTS

WO    0177525 A1    10/2001
WO   WO 2007/071239 A1 *   6/2007

* cited by examiner

*Primary Examiner* — Nathaniel Wiehe
(74) *Attorney, Agent, or Firm* — James McGinness, Esq.; Armstrong Teasdale LLP (57) ABSTRACT

A lubrication system for a wind turbine having a control system, the lubrication system including a sump configured to collect a lubrication fluid, and at least one heating unit configured to heat the lubrication fluid based on at least one forecasted condition.

20 Claims, 5 Drawing Sheets

METHOD AND SYSTEM FOR OPERATING A WIND TURBINE

BACKGROUND OF THE INVENTION

The subject matter described herein relates generally to wind turbines and, more particularly, to a method and system for operating a wind turbine.

Wind turbines generally include a rotor having multiple blades that are attached to a rotatable hub. The rotor transforms wind energy into a rotational torque that drives one or more shafts. Often, the shafts are rotatably coupled to a gearbox that steps up the inherently low rotational speed of the rotor. The gearbox rotates a high speed shaft that drives a generator to produce electrical power, which is fed into a utility grid or to another destination.

At least some known gearboxes require lubrication to function effectively. Typically, a pump transports lubrication oil to the gearbox, and a sump collects the lubrication oil after the gearbox has been lubricated. In cold environments, the lubrication oil may become viscous and resistant to flow. In such environments, one or more heaters may be used to heat the lubrication oil to maintain a sufficient viscosity of the lubrication oil during operation.

If a wind turbine is idle for an extended period of time, the lubrication oil may need to be heated before the wind turbine resumes operation. In some known wind turbines, the heating of the lubrication oil may take between 6 and 8 hours, or longer. In such situations, a wind turbine may be unavailable to generate power while the lubrication oil is being heated, and significant revenue may be lost.

BRIEF DESCRIPTION OF THE INVENTION

In one embodiment, a lubrication system for a wind turbine including a control system is provided that includes a sump that is configured to collect a lubrication fluid and at least one heating unit that is configured to heat the lubrication fluid based on at least one forecasted condition.

In another embodiment, a wind turbine is provided that includes a control system configured to obtain at least one forecasted condition and prepare the wind turbine for generating power based on the forecasted condition.

In another embodiment, a method for operating a wind turbine is provided that includes transporting a lubrication fluid to at least one component within the wind turbine, heating the lubrication fluid with at least one heating unit, and controlling the heating unit based on at least one forecasted condition.

DETAILED DESCRIPTION OF THE INVENTION

The embodiments described herein provide a lubrication system for a wind turbine. The lubrication system obtains one or more forecasted conditions from a wind forecast system. The lubrication system compares the forecasted conditions to one or more requirements to determine whether the wind turbine may commence or resume generating power. The lubrication system also measures a temperature of a lubrication fluid within the wind turbine. The lubrication fluid is preheated to a minimum operating temperature in advance of the arrival of the meteorological conditions that enable the wind turbine to generate power. As such, the lubrication system facilitates enabling the wind turbine to be prepared for the arrival of usable wind power.

Figure 1:
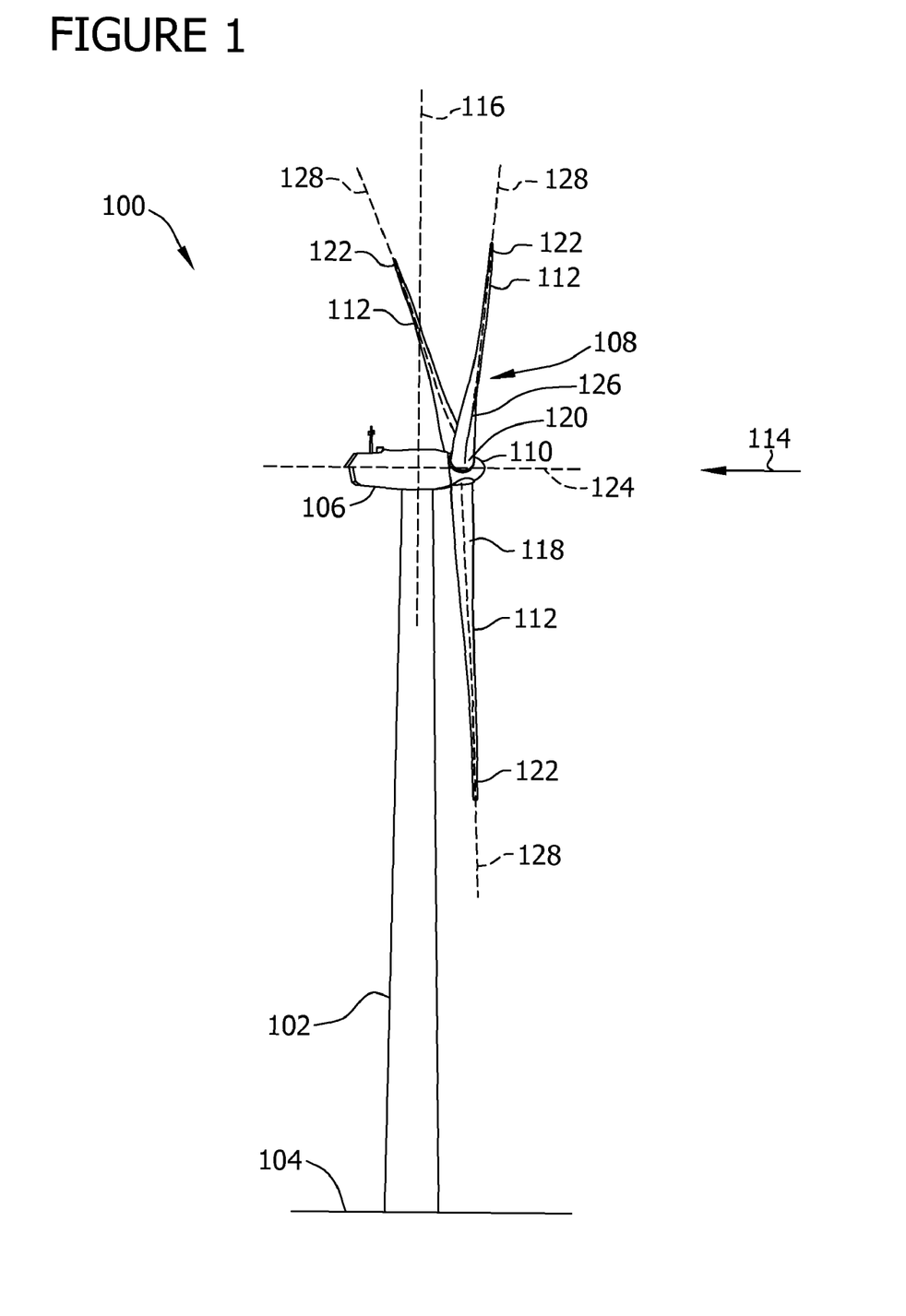
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to the direction of wind 114. Rotor blades 112 are mated to hub 110 by coupling a blade root portion 118 to hub 110 at a plurality of load transfer regions 120. Load transfer regions 120 each have a hub load transfer region and a blade load transfer region (both not shown in FIG. 1). Loads induced to rotor blades 112 are transferred to hub 110 via load transfer regions 120. Each rotor blade 112 also includes a blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine generator to function as described herein. For example, rotor blades 112 may have a suitable length less than 30 m or greater than 120 m. As wind 114 contacts rotor blade 112, blade lift forces are induced to rotor blade 112 and rotation of rotor 108 about an axis of rotation 124 is induced as blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). Specifically, increasing a pitch angle of rotor blade 112 decreases an amount of blade surface area 126 exposed to wind 114 and, conversely, decreasing a pitch angle of rotor blade 112 increases an amount of blade surface area 126 exposed to wind 114. The pitch angles of rotor blades 112 are adjusted about a pitch axis 128 at each rotor blade 112. In the exemplary embodiment, the pitch angles of rotor blades 112 are controlled individually. Alternatively, the pitch angles of rotor blades 112 are controlled as a group.

Figure 2:
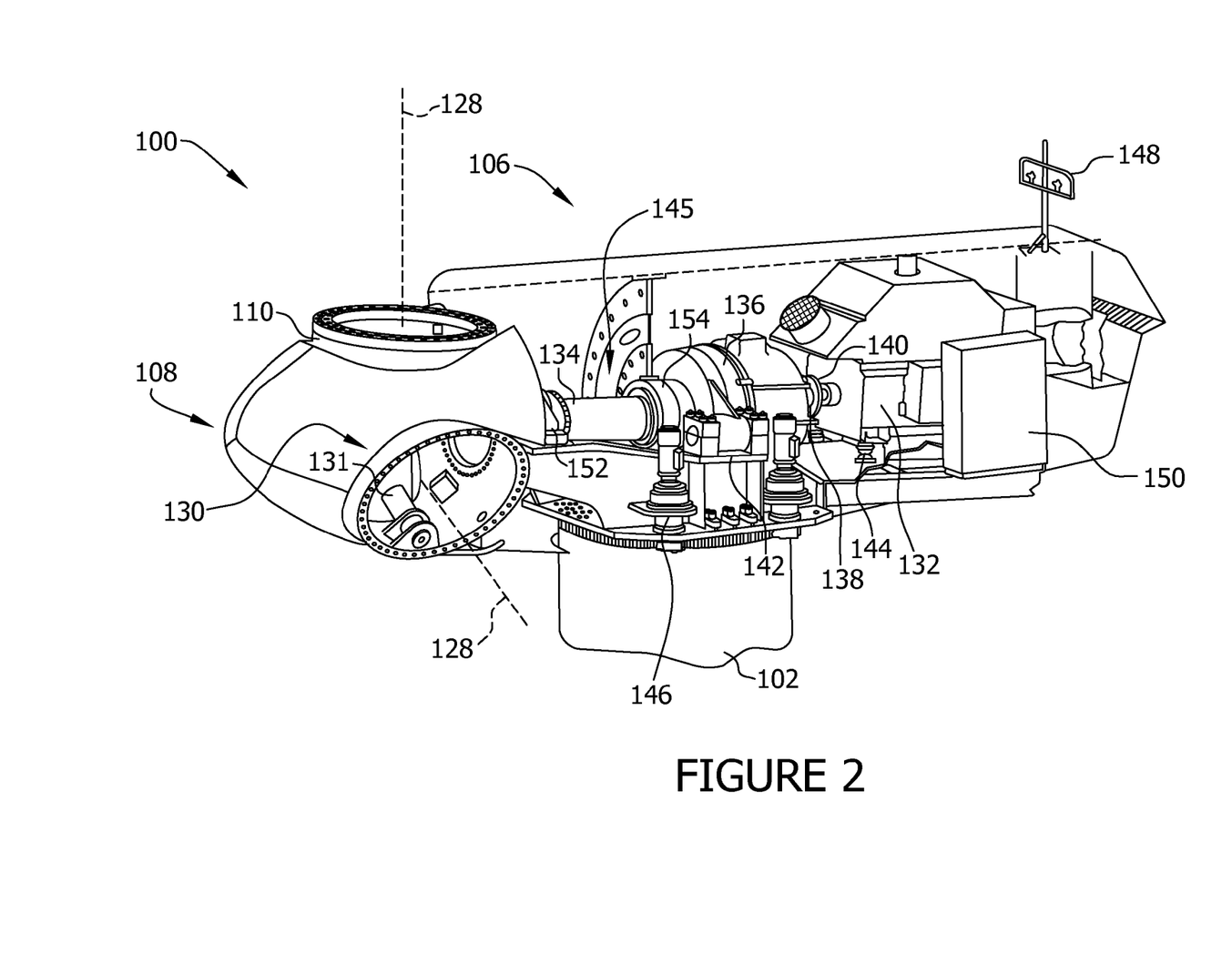
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by support 142 and generator 132 is supported by support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, mast 148 provides information, including wind direction and/or wind speed, to a control system 150. Control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, control system 150 may execute a SCADA (Supervisory, Control and Data Acquisition) program.

Pitch assembly 130 is operatively coupled to control system 150. In the exemplary embodiment, nacelle 106 also includes main, or forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Alternatively, nacelle 106 includes any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 145.

Figure 3:
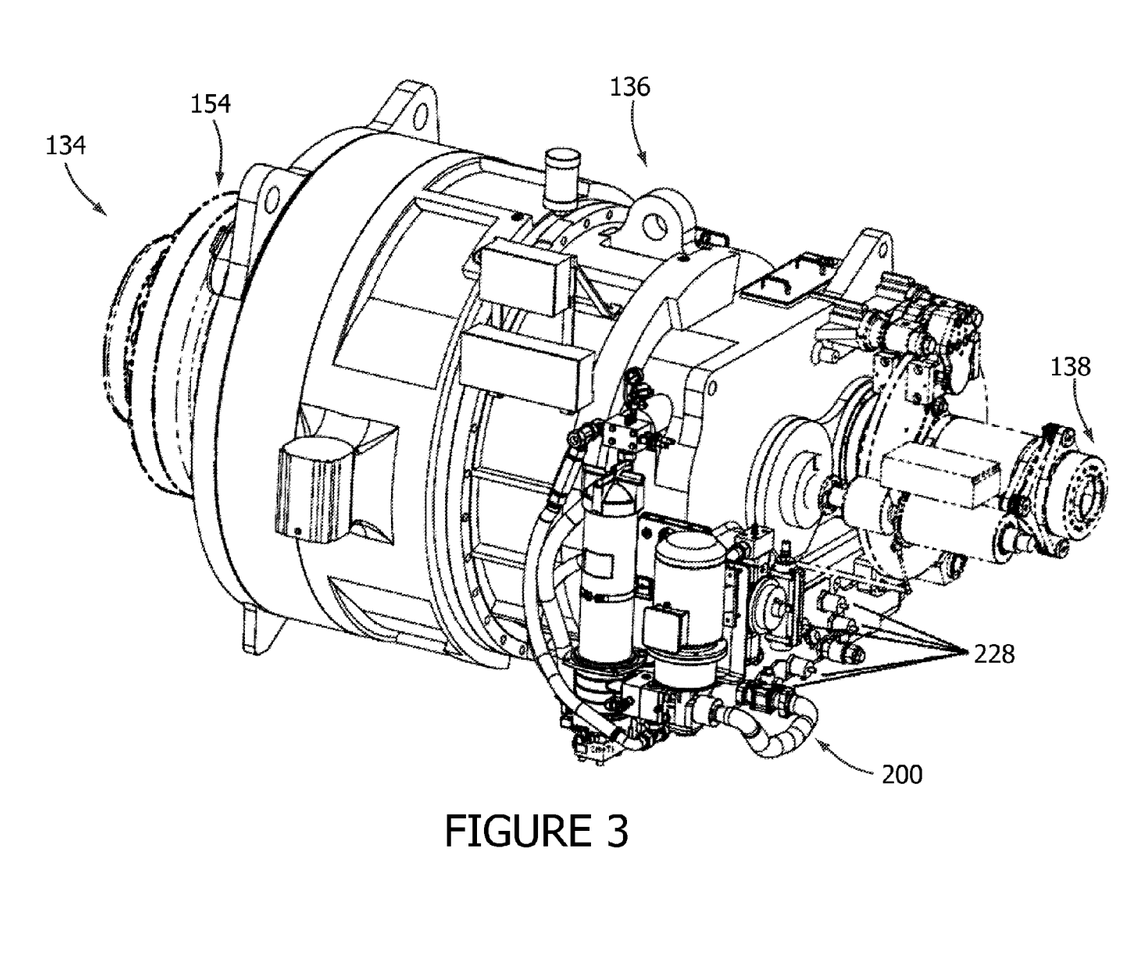
FIG. 3 is an isometric view of an exemplary gearbox and an exemplary lubrication system suitable for use with the nacelle shown in FIG. 2.
Figure 4:
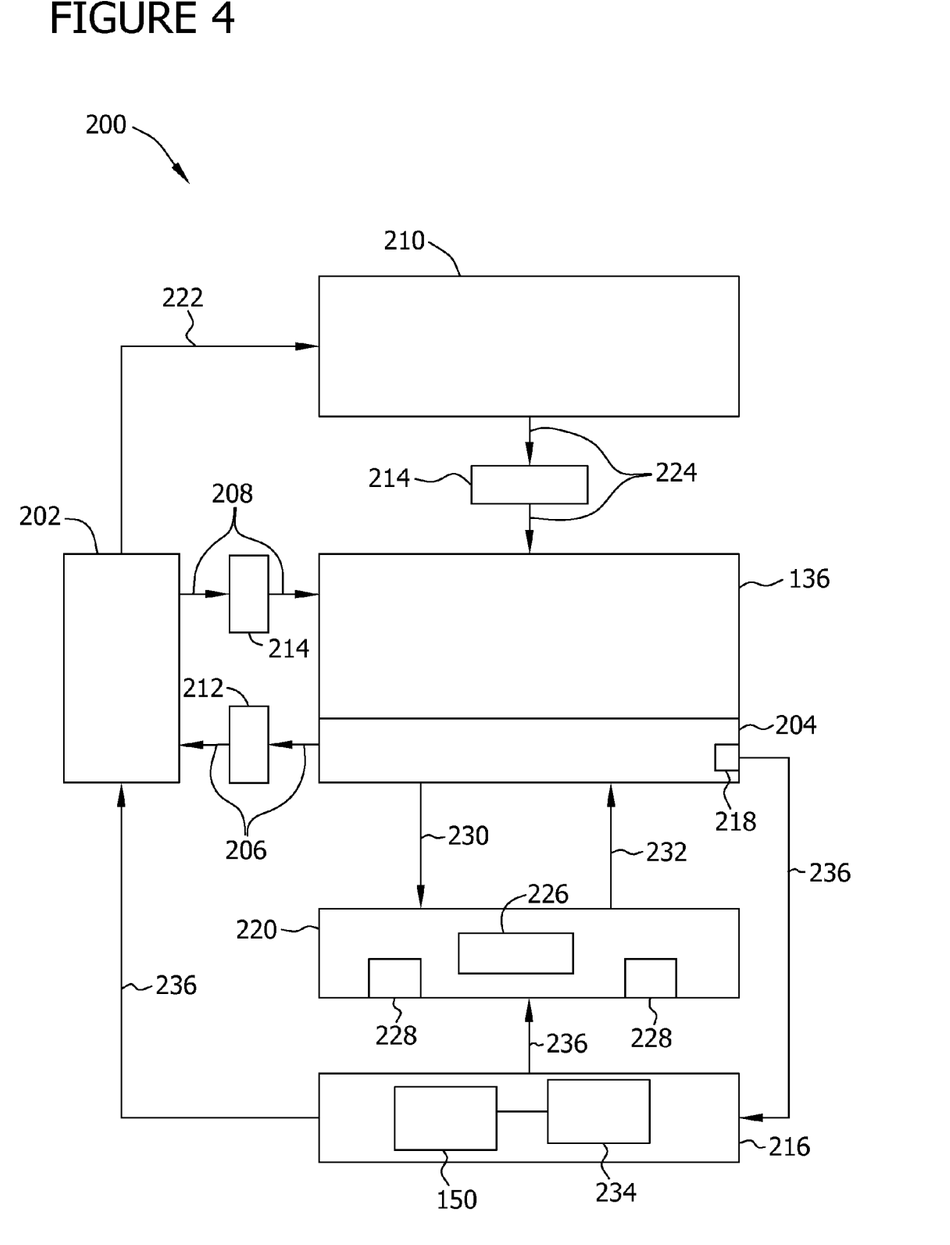
FIG. 4 is a block diagram of the gearbox and the lubrication system shown in FIG. 3.

FIG. 3 is an isometric view of exemplary gearbox 136 and an exemplary lubrication system 200 that facilitates lubricating one or more components of gearbox 136 and/or one or more components of wind turbine 100 (shown in FIG. 1). FIG. 4 is a schematic view of gearbox 136 and lubrication system 200. In the exemplary embodiment, a circulation pump 202 transports a lubrication fluid, such as an oil having suitable flow characteristics, for example, through lubrication system 200. Circulation pump 202 draws the lubrication fluid from a sump 204 of gearbox 136 via a circulation pump intake conduit 206. Circulation pump 202 includes an internal valve (not shown) to selectively return the lubrication fluid to gearbox 136 via a circulation pump discharge conduit 208 or to direct the lubrication fluid to a heat exchanger 210. Circulation pump intake conduit 206 and/or circulation pump 202 includes a filter 212 to remove impurities from the lubrication fluid. Circulation pump discharge conduit 208 includes a pressure reduction valve 214 to facilitate returning the lubrication fluid to gearbox 136 at a desired pressure. In one embodiment, one or more spray nozzles (not shown) deliver the lubrication fluid from circulation pump discharge conduit 208 and/or from pressure reduction valve 214 to gearbox 136 and/or to sump 204 substantially in the form of a mist or spray. In the exemplary embodiment, lubrication system 200 includes a temperature control system 216 that controls an operation of one or more components of lubrication system 200. One or more temperature sensors 218 in communication with temperature control system 216 measure a temperature of the lubrication fluid and generate and transmit one or more signals representative of the measured temperature. Lubrication system 200 also includes a heating system 220 that heats the lubrication fluid.

As shown in FIG. 4, one temperature sensor 218 is coupled to sump 204 and measures a temperature of the lubrication fluid within sump 204. Although not shown in FIG. 4, in one embodiment, additional temperature sensors 218 may be operatively coupled to other components within lubrication system 200, such as to circulation pump intake conduit 206, to heating system 220, to heat exchanger 210, and/or to any suitable component of lubrication system 200. In the exemplary embodiment, temperature sensor 218 is operatively coupled to temperature control system 216, and temperature sensor 218 transmits the measured lubrication fluid temperature to temperature control system 216. Temperature control system 216 receives the measured lubrication fluid temperature and compares the lubrication fluid temperature with a first temperature, such as a predefined first minimum threshold temperature. In the exemplary embodiment, the first minimum threshold temperature is a minimum temperature that enables the lubrication fluid to flow with sufficient viscosity to prevent or minimize damage to one or more components of lubrication system 200, such as circulation pump 202, and/or one or more components of wind turbine 100. In one embodiment, the first minimum threshold temperature is about 30° C. Alternatively, the first minimum threshold temperature is any suitable temperature that enables lubrication system 200 and wind turbine 100 to operate as described herein. If the measured lubrication fluid temperature is below the first minimum threshold temperature, temperature control system 216 may deactivate or reduce a speed of circulation pump 202.

Temperature control system 216 also compares the measured lubrication fluid temperature with a predefined maximum threshold temperature. In the exemplary embodiment, the maximum threshold temperature is a maximum temperature of lubrication fluid that prevents or minimizes damage to one or more components of lubrication system 200 and/or one or more components of wind turbine 100. In one embodiment, the maximum threshold temperature is about 70° C. Alternatively, the maximum threshold temperature is any suitable temperature that enables lubrication system 200 and wind turbine 100 to operate as described herein. If the measured lubrication fluid temperature is above the maximum threshold temperature, circulation pump 202 transports the lubrication fluid to heat exchanger 210 via a heat exchange intake conduit 222. Heat exchanger 210 removes heat from the lubrication fluid and returns the cooled lubrication fluid to gearbox 136 via a heat exchange discharge conduit 224 having a pressure reduction valve 214. In one embodiment, one or more spray nozzles (not shown) deliver the cooled lubrication fluid from heat exchange discharge conduit 224 through pressure reduction valve 214 to gearbox 136 and/or to sump 204 substantially in the form of a mist or spray. The lubrication fluid spray facilitates lubricating one or more components of gearbox 136, and the lubrication fluid is gravity fed to sump 204. The lubrication fluid is collected within sump 204 and is transported again through lubrication system 200 by circulation pump 202 as necessary to facilitate lubricating one or more components of gearbox 136 and/or wind turbine 100.

In the exemplary embodiment, heating system 220 includes a heating system pump 226 and one or more heating units 228. Although two heating units 228 are shown in FIG. 4, lubrication system 200 may include any suitable number of heating units 228. Alternatively, lubrication system 200 includes a single heating unit 228. Heating units 228 heat the lubrication fluid to a temperature equal to a predefined second minimum threshold temperature to enable the lubrication fluid to become sufficiently viscous to prevent or minimize damage to circulation pump 202 and/or to heating system pump 226. In the exemplary embodiment, the second minimum threshold temperature is equal to the first minimum threshold temperature of the lubrication fluid. Alternatively, the second minimum threshold temperature is greater than the first minimum threshold temperature, or less than the first minimum threshold temperature. Heating system pump 226 draws the lubrication fluid from gearbox 136 and/or sump 204 through a heating system intake conduit 230 and returns the heated lubrication fluid to gearbox 136 and/or sump 204 through a heating system discharge conduit 232. Once the lubrication fluid temperature reaches or exceeds the second minimum threshold temperature, temperature control system 216 may activate or increase the speed of circulation pump 202.

In the exemplary embodiment, temperature control system 216 includes control system 150 and a wind forecast system 234. Temperature control system 216 is operatively coupled to temperature sensor 218, to heating system 220, and to circulation pump 202 via one or more control wires 236. Alternatively or additionally, temperature control system 216 is operatively coupled to any suitable component of lubrication system 200. In the exemplary embodiment, wind forecast system 234 provides one or more forecasted conditions at or near wind turbine 100. Wind forecast system 234 includes one or more software components that are executed by one or more controllers (not shown). In the exemplary embodiment, wind forecast system 234 is executed by one or more controllers within a wind farm control system (both not shown). As such, the wind farm control system may control a plurality of wind turbines within a wind farm, and may preheat a lubrication fluid within each wind turbine using wind forecast system 234 as described herein. In an alternative embodiment, wind forecast system 234 is executed by a controller (not shown) within control system 150. In one embodiment, wind forecast system 234 uses a forecasting method substantially similar to one or more methods described in U.S. Pat. No. 7,523,001. Alternatively, wind forecast system 234 uses any suitable forecasting method.

In the exemplary embodiment, lubrication system 200 is configured in a "wet sump" configuration, wherein the lubrication fluid is collected and heated within sump 204 (i.e., heating system 220 heats the lubrication fluid and returns the heated lubrication fluid to sump 204). In an alternative embodiment, lubrication system 200 is configured in a "dry sump" configuration, wherein the lubrication fluid is stored in a storage tank (not shown) that is separate from sump 204. In the alternative embodiment, the lubrication fluid is heated within the storage tank by heating system 220 in a similar manner as described above with reference to sump 204. The lubrication fluid is transported from the storage tank to gearbox 136 and/or to other components of wind turbine 100 by circulation pump 202, or another suitable pump, to lubricate gearbox 136 and/or the other components of wind turbine 100.

Figure 5:
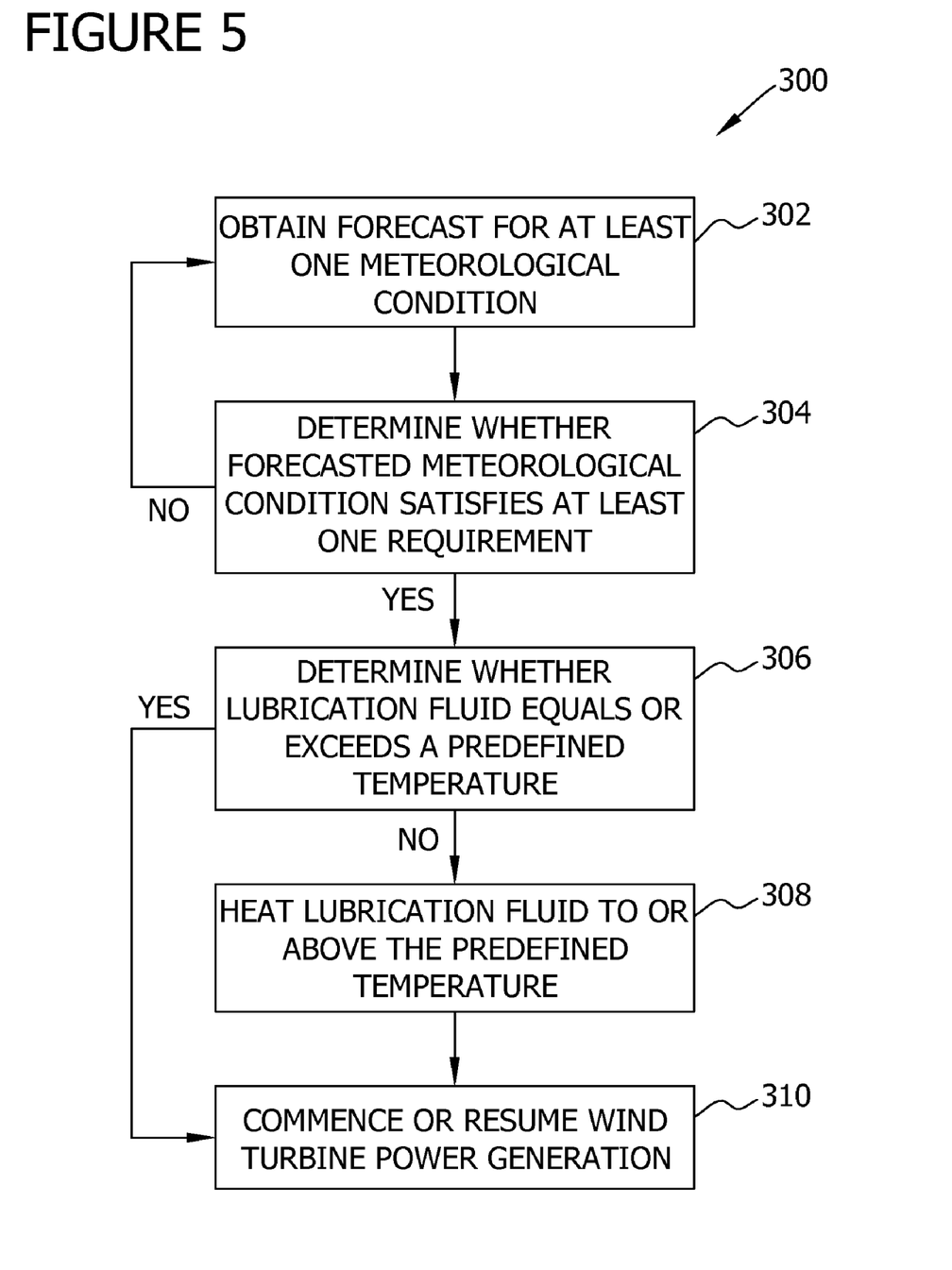
FIG. 5 is a flowchart illustrating an exemplary method for operating a wind turbine suitable for use with the gearbox and the lubrication system shown in FIG. 3 and FIG. 4.

FIG. 5 is a flowchart illustrating an exemplary method 300 for operating wind turbine 100 (shown in FIG. 1). In the exemplary embodiment, wind forecast system 234 (shown in FIG. 4) obtains 302 a forecast for at least one condition, such as a meteorological condition including, without limitation, a wind speed proximate wind turbine 100 (shown in FIG. 1), a wind direction, an ambient temperature proximate wind turbine 100, an atmospheric pressure, an air density, and/or any suitable meteorological condition. Alternatively, wind forecast system 234, control system 150, and/or another suitable control system obtains 302 a forecasted or trigger condition, such as a scheduled startup of wind turbine 100, a periodic startup or heating event, a scheduled maintenance event, or any suitable forecasted event. In the exemplary embodiment, the forecast also includes a time component, such as an expected time that the meteorological condition will occur. For example, wind forecast system 234 may determine that a wind speed of 5 meters per second (m/s) is expected to develop at or near wind turbine 100 within approximately 8 hours. In one embodiment, wind forecast system 234 transmits the forecasted meteorological condition to control system 150 (shown in FIG. 4), and control system 150 performs one or more comparisons or other operations based on the forecasted meteorological condition.

Temperature control system 216 (shown in FIG. 4) determines 304 whether the forecasted meteorological condition satisfies at least one requirement. In the exemplary embodiment, temperature control system 216 determines 304 whether a forecasted wind speed equals or exceeds a minimum wind speed for wind turbine 100 to commence operation within a predefined time. The minimum wind speed may be a rated cut-in speed of wind turbine 100, the rated cut-in speed plus an additional offset, or any suitable wind speed. The predefined time may be a minimum amount of time that enables heating system 220 (shown in FIG. 4) to preheat the lubrication fluid to a desired temperature, or any suitable time period. In an alternative embodiment, any suitable requirement that enables temperature control system 216 to operate as described herein may be used to control an operation of wind turbine 100. If the forecasted wind speed is determined 304 to be insufficient (i.e., the forecasted wind speed does not equal or exceed the minimum wind speed within the predefined time period), wind forecast system 234 obtains 302 another forecast for at least one meteorological condition. Alternatively or additionally, wind turbine 100 may shut down or may operate at reduced power if the forecasted wind speed is determined 304 to be insufficient. If wind turbine 100 is already operating in a reduced power state, wind turbine 100 may remain in the reduced power state until the forecasted wind speed is determined 304 to be sufficient to operate wind turbine 100.

If the forecasted wind speed is determined 304 to be sufficient to operate wind turbine 100, temperature control system 216 determines 306 whether a temperature of the lubrication fluid equals or exceeds a predefined temperature. In the exemplary embodiment, temperature sensor 218 measures the temperature of the lubrication fluid and transmits the measured temperature to temperature control system 216. Temperature control system 216 compares the measured lubrication fluid temperature to a predefined temperature, such as the first minimum threshold temperature of the lubrication fluid as described in reference to FIG. 4, and determines 306 whether the measured temperature equals or exceeds the predefined temperature. If the measured lubrication fluid temperature does not equal or exceed the predefined temperature of the lubrication fluid, temperature control system 216 heats 308 the lubrication fluid to the predefined temperature as described more fully herein. Conversely, if the measured lubrication fluid temperature equals or exceeds the predefined temperature of the lubrication fluid, wind turbine 100 commences or resumes 310 operation as described more fully herein.

Temperature control system 216 heats 308 the lubrication fluid to the predefined temperature, or to a temperature above the predefined temperature. In one embodiment, temperature control system 216 heats 308 the lubrication fluid to the second minimum threshold temperature described in reference to FIG. 4. In the exemplary embodiment, temperature control system 216 activates heating system pump 226 to draw the lubrication fluid into heating system 220, and activates heating units 228 to heat 308 the lubrication fluid. Temperature sensor 218 continuously, intermittently, or periodically measures the temperature of the lubrication fluid and transmits the measured lubrication fluid temperature to temperature control system 216. Once the lubrication fluid is heated 308 to the desired temperature, temperature control system 216 deactivates heating system pump 226 and heating units 228.

Once the lubrication fluid is heated 308 to the desired temperature, wind turbine 100 may commence or resume 310 operation, such as by activating circulation pump 202 (shown in FIG. 4) and/or by generating power. In one embodiment, wind turbine 100 waits for the forecasted wind speed to materialize, and heats 308 the lubrication fluid as necessary if the lubrication fluid cools below the predefined temperature.

While wind forecast system 234 and temperature control system 216 are used to preheat the lubrication fluid in advance of the arrival of usable wind power, wind forecast system 234 and/or temperature control system 216 are not limited to preheating lubrication fluid. Rather, wind forecast system 234 and/or temperature control system 216 may be used to prepare other components and/or systems for the arrival of usable wind power, or any suitable condition. For example, one or more components and/or systems of wind turbine 100 may be pressurized to a predefined pressure in advance of usable wind. As a further example, wind forecast system 234 and/or temperature control system 216 may engage one or more heating units (not shown) and/or other systems to heat one or more components of rotor 106 and/or wind turbine 100, such as blades 108, in a de-icing operation in advance of usable wind or another suitable condition. Alternatively, wind forecast system 234 and/or temperature control system 216 may prepare one or more components and/or systems of wind turbine 100 for the arrival of usable wind power by increasing or decreasing any suitable operating condition to a desired level within a desired time. As such, in one embodiment, a control system, such as control system 150, wind forecast system 234, and/or temperature control system 216, is configured to obtain at least one forecasted condition and to prepare wind turbine 100 for generating power based on the forecasted condition.

In one embodiment, a method for operating a wind turbine includes heating a lubrication fluid with at least one heating unit, transporting the lubrication fluid to at least one component within the wind turbine, and controlling the heating unit based on at least one forecasted condition. A pump is used to transport the lubrication fluid to the component and to return the lubrication fluid from the component to a sump, and the pump is configured to cease operating when a temperature of the lubrication fluid falls below a first predefined temperature. The pump is configured to operate when the temperature of the lubrication fluid reaches a second predefined temperature. At least one of a forecasted wind speed, a forecasted wind direction, a forecasted temperature, a forecasted atmospheric pressure, and a forecasted air density is used to control the heating unit. The heating unit is operated when the forecasted condition is above a threshold.

A technical effect of the systems and method described herein includes at least one of: (a) heating a lubrication fluid with at least one heating unit; (b) transporting a lubrication fluid to at least one component within a wind turbine; and (c) controlling at least one heating unit based on at least one forecasted condition.

The above-described embodiments facilitate providing an efficient and cost-effective lubrication system for a wind turbine. The lubrication system preheats a lubrication fluid to a minimum temperature in advance of a sufficient wind speed becoming available. The wind turbine may start generating power substantially when usable wind power is available, rather than being forced to wait for the lubrication fluid to be preheated after a period of inactivity. As such, the lubrication system facilitates enabling the wind turbine to capture more power and to operate more efficiently than at least some known wind turbines. Moreover, the lubrication system enables the wind turbine to preheat the lubrication fluid gradually. As such, the use of the lubrication system described herein facilitates reducing a size, a number, and/or a cost of heating units that may be used to heat the lubrication fluid.

Exemplary embodiments of a method, system, and apparatus for operating a wind turbine are described above in detail. The method, system, and apparatus are not limited to the specific embodiments described herein, but rather, components of the system and/or apparatus and/or steps of the method may be utilized independently and separately from other components and/or steps described herein. For example, the lubrication system may also be used in combination with other power systems and methods, and is not limited to practice with only the wind turbine as described herein. Rather, the exemplary embodiment can be implemented and utilized in connection with many other mechanical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lubrication system for a wind turbine, said lubrication system comprising:
   a sump configured to collect a lubrication fluid; and,
   at least one heating unit configured to heat the lubrication fluid based on at least one forecasted condition.

2. A lubrication system in accordance with claim 1, further comprising a pump configured to transport the lubrication fluid from said sump through at least a portion of the wind turbine and to return the lubrication fluid to said sump.

3. A lubrication system in accordance with claim 2, wherein said pump is configured to cease operating when a temperature of the lubrication fluid falls below a first predefined temperature.

4. A lubrication system in accordance with claim 3, wherein said heating unit is configured to heat the lubrication fluid within said sump to a second predefined temperature.

5. A lubrication system in accordance with claim 4, wherein said pump is configured to operate when the temperature of the lubrication fluid reaches the second predefined temperature.

6. A lubrication system in accordance with claim 1, wherein the forecasted condition includes at least one of a forecasted wind speed, a forecasted wind direction, a forecasted temperature, a forecasted atmospheric pressure, and a forecasted air density.

7. A lubrication system in accordance with claim 6, wherein said heating unit is configured to operate when the forecasted wind speed is above a threshold.

8. A lubrication system in accordance with claim 1, further comprising a control system configured to transmit signals to said heating unit.

9. A wind turbine, comprising:
   a control system configured to:
      obtain at least one forecasted condition;
      prepare said wind turbine for generating power based on the forecasted condition.

10. A wind turbine in accordance with claim 9, further comprising:
    a gearbox; and,
    a lubrication system configured to lubricate said gearbox, said lubrication system comprising:
       a sump configured to collect a lubrication fluid; and,
       at least one heating unit configured to heat the lubrication fluid;
    wherein said control system is further configured to operate said heating unit based on the forecasted condition.

11. A wind turbine in accordance with claim 10, further comprising a pump configured to transport the lubrication fluid from said sump through at least a portion of said wind turbine and to return the lubrication fluid to said sump.

12. A wind turbine in accordance with claim 11, wherein said pump is configured to cease operating when a temperature of the lubrication fluid falls below a first predefined temperature.

13. A wind turbine in accordance with claim 12, wherein said heating unit is configured to heat the lubrication fluid within said sump to a second predefined temperature.

14. A wind turbine in accordance with claim 13, wherein said pump is configured to operate when the temperature of the lubrication fluid reaches the second predefined temperature.

15. A wind turbine in accordance with claim 9, wherein the forecasted condition includes at least one of a forecasted wind speed, a forecasted wind direction, a forecasted temperature, a forecasted atmospheric pressure, and a forecasted air density, said control system is configured to prepare said wind turbine for generating power when the forecasted condition is above a threshold.

16. A method for operating a wind turbine, said method comprising:
    heating a lubrication fluid with at least one heating unit within the wind turbine;
    transporting the lubrication fluid to at least one component within the wind turbine; and,
    controlling the heating unit based on at least one forecasted condition.

17. A method in accordance with claim 16, further comprising:
    using a pump to transport the lubrication fluid to the component and to return the lubrication fluid from the component to a sump; and,
    configuring the pump to cease operating when a temperature of the lubrication fluid falls below a first predefined temperature.

18. A method in accordance with claim 17, further comprising configuring the pump to operate when the temperature of the lubrication fluid reaches a second predefined temperature.

19. A method in accordance with claim 16, further comprising using at least one of a forecasted wind speed, a forecasted wind direction, a forecasted temperature, a forecasted atmospheric pressure, and a forecasted air density to control the heating unit.

20. A method in accordance with claim 19, further comprising operating the heating unit when the forecasted condition is above a threshold.

* * * * *